(No Model.)
A. H. GALLUP & W. SALLEE.
MONKEY WRENCH.
No. 462,280. Patented Nov. 3, 1891.
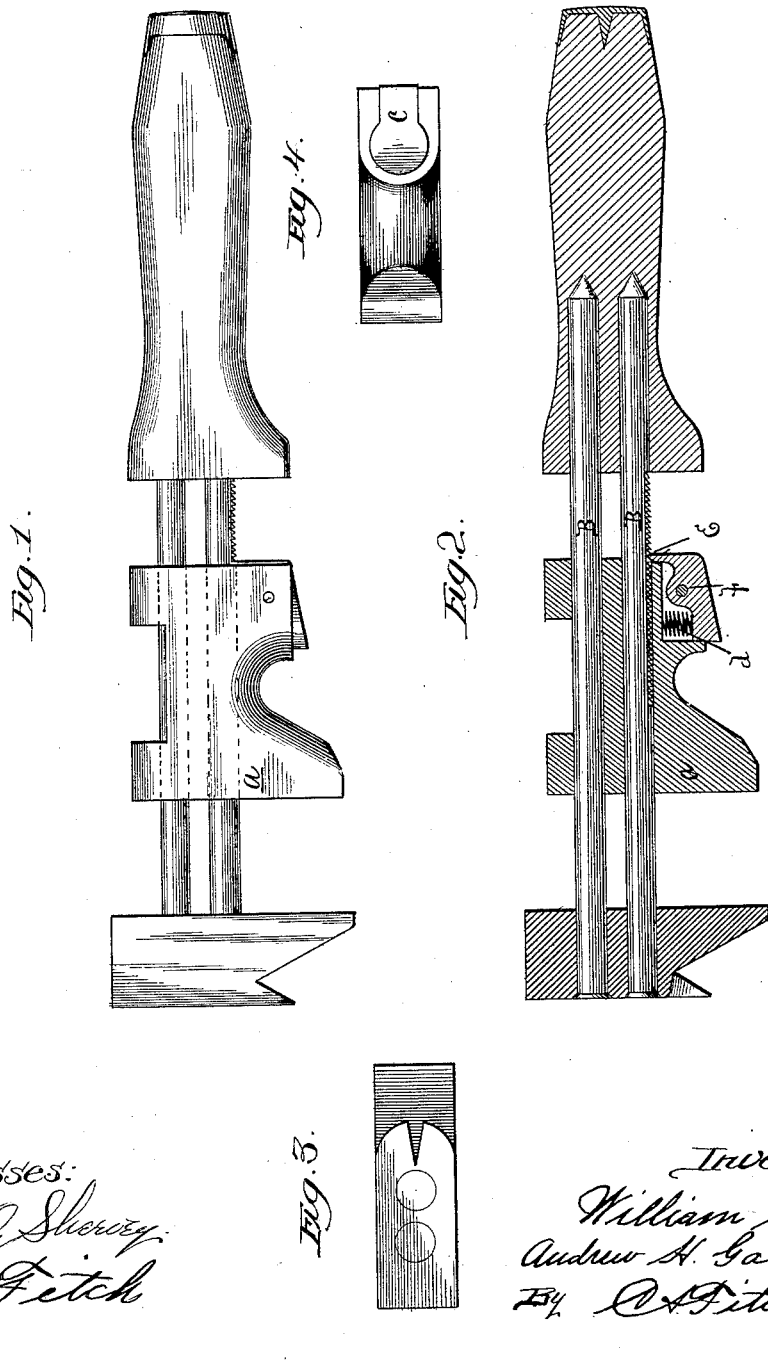
Witnesses:
Chas. O. Shervey
O. A. Fitch
Inventor:
William Sallee
Andrew H. Gallup
By O. A. Fitch
Attys.

UNITED STATES PATENT OFFICE.

ANDREW H. GALLUP AND WILLIAM SALLEE, OF CHICAGO, ILLINOIS.

MONKEY-WRENCH.

SPECIFICATION forming part of Letters Patent No. 462,280, dated November 3, 1891.

Application filed May 29, 1891. Serial No. 394,589. (No model.)

*To all whom it may concern:*

Be it known that we, ANDREW H. GALLUP and WILLIAM SALLEE, citizens of the United States of America, residing at Chicago, in the county of Cook and State of Illinois, have invented certain new and useful Improvements in a Monkey-Wrench; and we do declare the following to be a correct and accurate description of the same and of the manner of constructing and using the invention in such full, clear, concise, and exact terms as to enable any person skilled in the art to which it appertains to construct and use the same, reference being had to the accompanying drawings, which form a part of this specification, the principle of the invention being therein shown and the best mode in which we have contemplated applying that principle, so as to distinguish it from other inventions.

The object of our invention is to make a monkey-wrench in which the movable jaw is controlled and held in place by means of a dog, which drops into notches cut into the guide-bars of the wrench, and thereby overcome the annoyance and loss of time encountered in adjusting the old-style monkey-wrench by means of a burr turning on a screw.

In the drawings and specifications like letters represent like parts.

Figure 1 represents a monkey-wrench as we propose to make it, complete and ready for use, and embodying the principles of our invention. Fig. 2 represents a sectional view showing guide-bars B B, movable jaw A, spiral spring $d$, pivot $f$, and dog E. Fig. 3 represents the rigid jaw of wrench, showing a claw for pulling out tacks and nails. Fig. 4 represents the thumb-piece of the lever which turns on the pivot $f$ and controls the dog E.

Letter A represents movable jaw.

Letter E represents the dog that serves to hold the movable jaw in place.

Letter $d$ represents a spiral spring which holds the dog E in place.

Letters B B represent the guide-bars on which the movable jaw A slides, and also show the notches for the reception of the dog E.

Letter $f$ represents a pivot.

We claim—

1. In a monkey-wrench, the combination of the movable jaw A, the guide-bars B B, showing notches for the reception of the dog E, the dog E, and the spring $d$.

2. In a monkey-wrench, the guide-bars B B, the dog E, the spring $d$, and the pivot $f$.

ANDREW H. GALLUP.
WILLIAM SALLEE.

Witnesses:
J. H. SALLEE,
WILLIAM CONROY.